Feb. 27, 1940.  G. WAITE  2,192,113
PARACHUTE APPARATUS
Filed March 28, 1934  6 Sheets-Sheet 1

INVENTOR.
George Waite
BY Lancaster, Allwine and Rommel
ATTORNEYS.

Feb. 27, 1940.  G. WAITE  2,192,113
PARACHUTE APPARATUS
Filed March 28, 1934  6 Sheets-Sheet 2

INVENTOR.
George Waite
BY
Lancaster, Allwine and Rommel
ATTORNEYS

Feb. 27, 1940. G. WAITE 2,192,113
PARACHUTE APPARATUS
Filed March 28, 1934 6 Sheets-Sheet 3
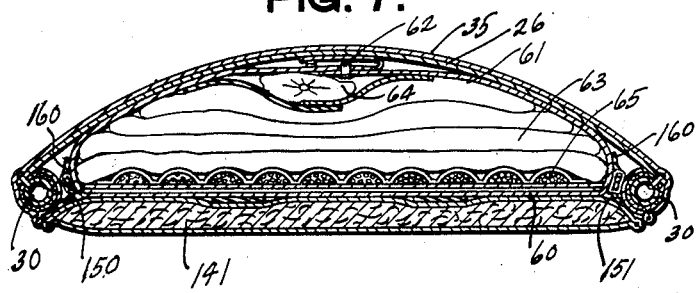
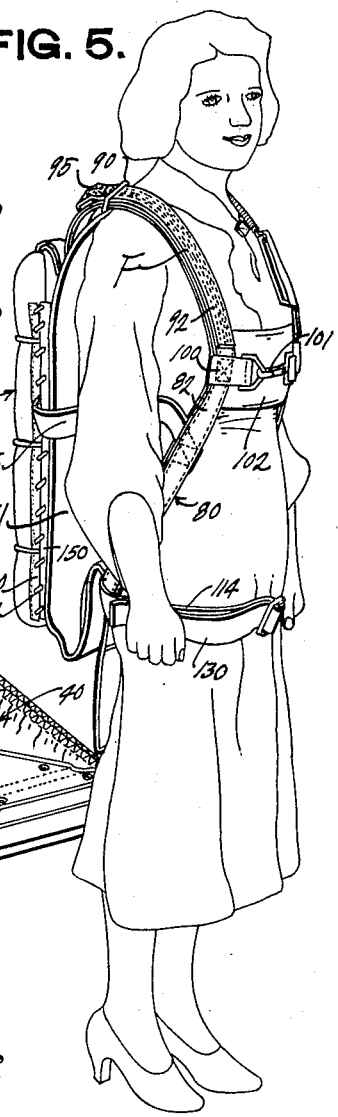
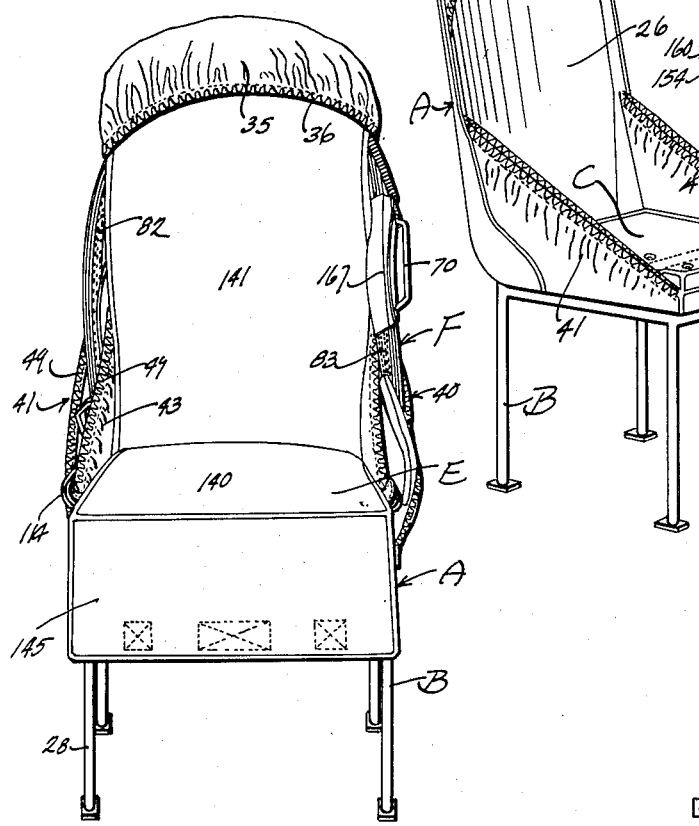
INVENTOR.
George Waite
BY Lancaster, Allwine and Rommel
ATTORNEYS.

Feb. 27, 1940.  G. WAITE  2,192,113
PARACHUTE APPARATUS
Filed March 28, 1934    6 Sheets-Sheet 4
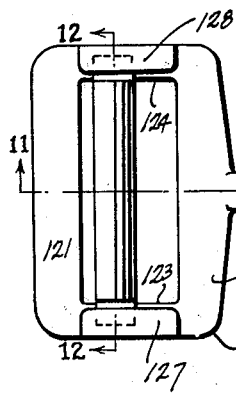
FIG. 10.
FIG. 9.
FIG. 11.
FIG. 12.
FIG. 13.
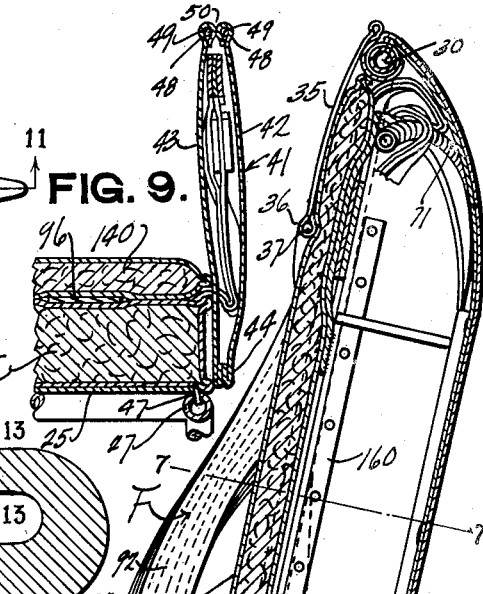
FIG. 8.
INVENTOR.
George Waite
BY Lancaster, Allwine and Rommel
ATTORNEYS.

INVENTOR.
George Waite
BY Lancaster, Allwine & Rommel
ATTORNEYS.

Feb. 27, 1940. G. WAITE 2,192,113
PARACHUTE APPARATUS
Filed March 28, 1934 6 Sheets-Sheet 6

INVENTOR.
George Waite
BY Lancaster, Allwine and Rommel
ATTORNEYS.

Patented Feb. 27, 1940

2,192,113

UNITED STATES PATENT OFFICE 2,192,113

PARACHUTE APPARATUS

George Waite, Buffalo, N. Y., assignor to Irving Air Chute Company, Inc., Buffalo, N. Y., a corporation Application March 28, 1934, Serial No. 717,836

7 Claims. (Cl. 244—122)

This invention relates to improvements in parachute apparatus, particularly with respect to a parachute chair wherein a passenger or aviator may be seated with comfort and safety. A parachute pack is inconspicuously associated with the chair, having a harness so arranged that it is located unobtrusively upon the chair, yet so arranged that when an emergency arises the aviator or passenger may instantly apply the harness to himself or herself, arise from the chair without difficulty, and in so doing remove the parachute pack free of the chair, so that there will be no interference to jumping free of the aircraft.

A further object of this invention is the provision of an improved parachute chair for aircraft, constituting an improvement upon the parachute chair shown in U. S. Patent #1,899,668 in the provision of more compact and comfortable means for housing the parachute pack and harness, so that there will be no liability of the harness parts becoming unsafely disarranged.

A further object of this invention is the provision of an improved parachute chair having improved means associated therewith for releasably pocketing certain parts of the parachute harness so that it is located unobtrusively and comfortably, yet with sufficient of the harness showing as to enable the passenger or aviator to readily slip into the same and fasten the harness upon his or her person.

A further object of this invention is the provision of an improved parachute harness of the general character set forth in a co-pending U. S. application, Serial No. 725,646, filed May 14, 1934 and embodying improvements thereover insofar as certain supporting strap and buckle arrangements are concerned.

A further object of this invention is the provision of an improved parachute chair having a compact and efficient association of pack, padding, harness and retaining means therefor, so that the chair normally simulates a conventional aircraft chair.

A further object of this invention is the provision of improved means for associating a parachute pack with an aircraft chair.

Other objects and advantages of the invention will be apparent during the course of the following detailed description.

In the accompanying drawings, forming a part of this specification, and wherein similar reference characters designate corresponding parts throughout the several views, Figure 1 is a perspective view of the improved parachute chair showing an individual seated therein.

Figure 1:
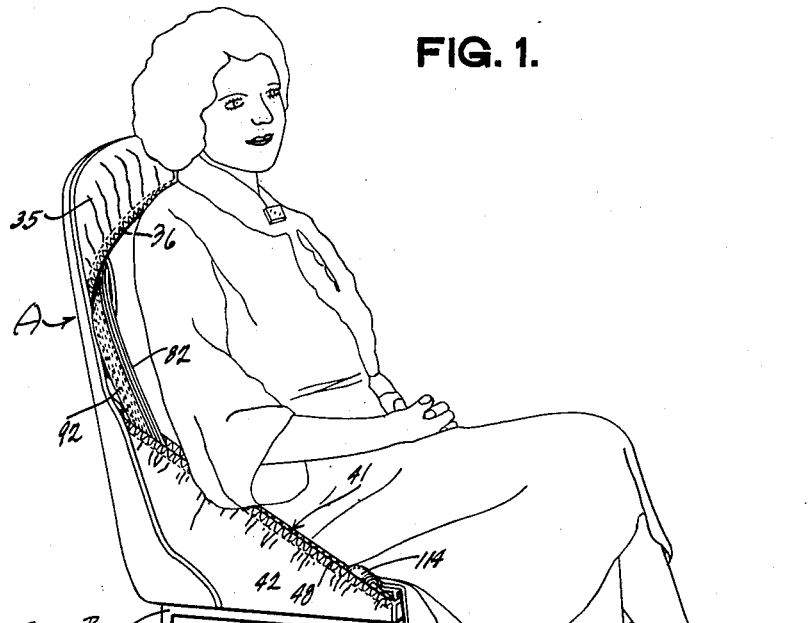
Figure 2:
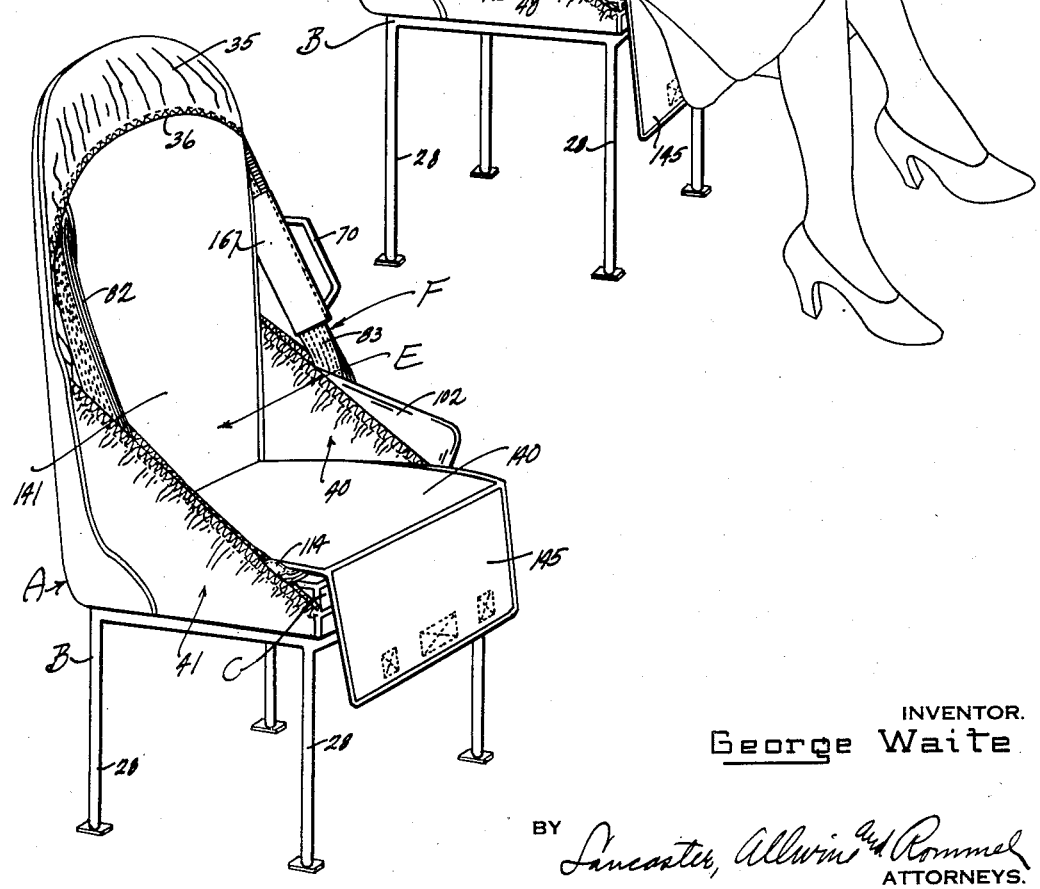
Figure 2 is a perspective view of the chair in normal condition showing the inconspicuous association of the parachute pack and harness with the chair details.
Figure 3:
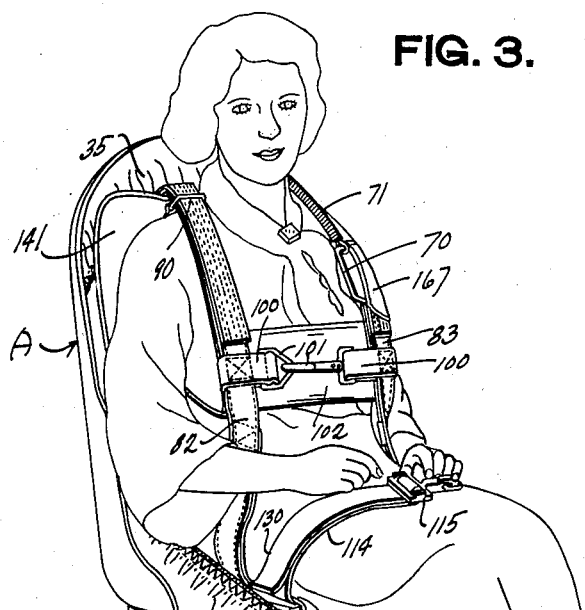
Figure 3 is a perspective view, similar to Figure 1, but with the harness applied to the lady seated in the chair.

Fgure 4 is another perspective view of the chair shown in Figure 2, showing a back and side view.

Figure 5 is a view showing the lady after arising from the parachute chair with the harness and pack attached in condition for a parachute jump.

Figure 4:
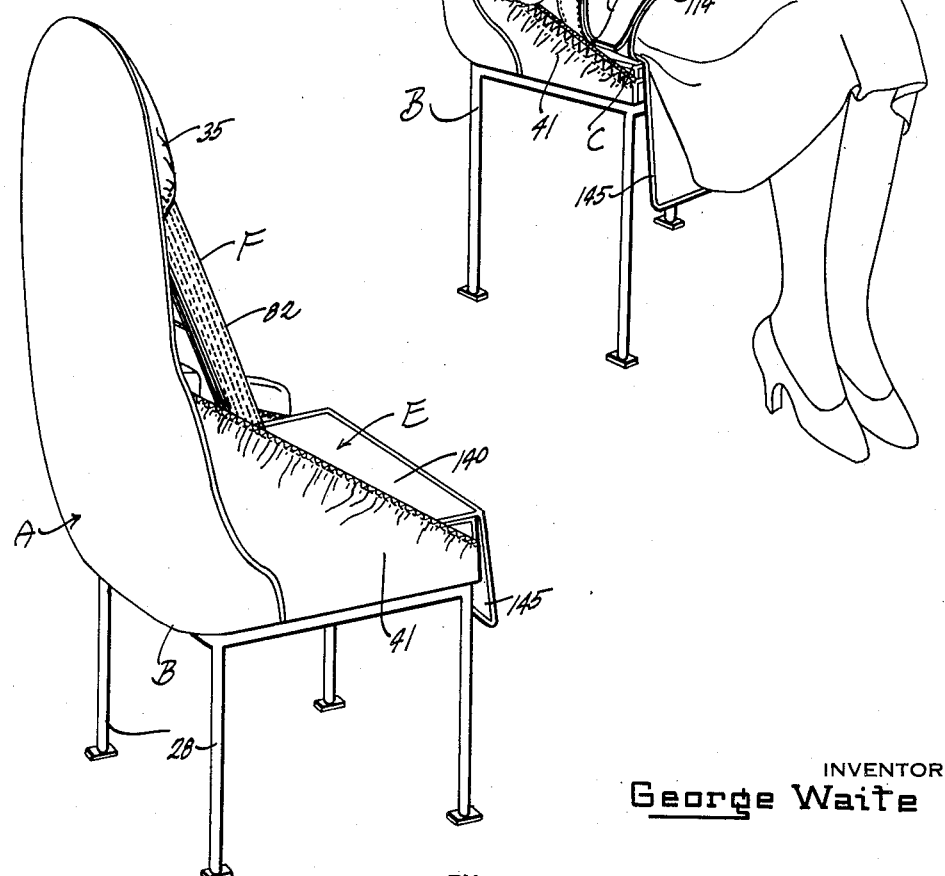

Figure 6 is a front view of the parachute chair of Figures 2 and 4.

Figure 7 is a cross sectional view taken substantially on the line 7—7 of Figure 8.

Figure 8 is a vertical cross sectional view taken through the improved parachute chair.

Figure 9 is a vertical sectional view taken substantially on the line 9—9 of Figure 8.

Figure 10 is a plan view of an improved strap coupling for parachute harnesses.

Figures 11 and 12 are cross sectional views taken substantially on their respective lines in Figure 10 of the drawings.

Figure 13 is a cross sectional view taken substantially on the line 13—13 of Figure 11.

Figure 14:
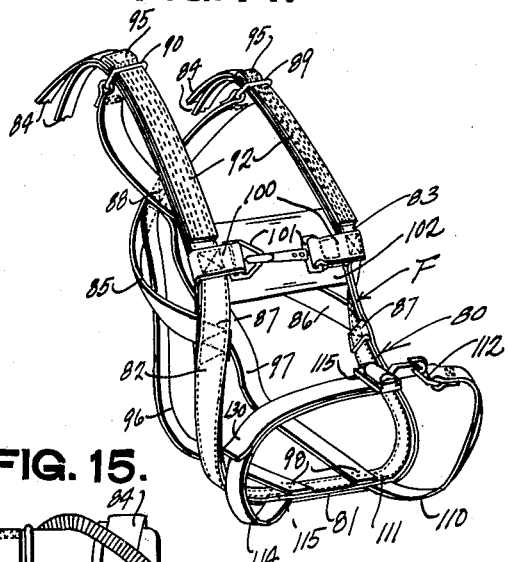

Figure 14 is a perspective view of the type of harness preferably associated with the parachute chair, and adapted to be worn by male or female passengers, altho preferably adapted for female passengers or aviatrixes.

Figure 15:
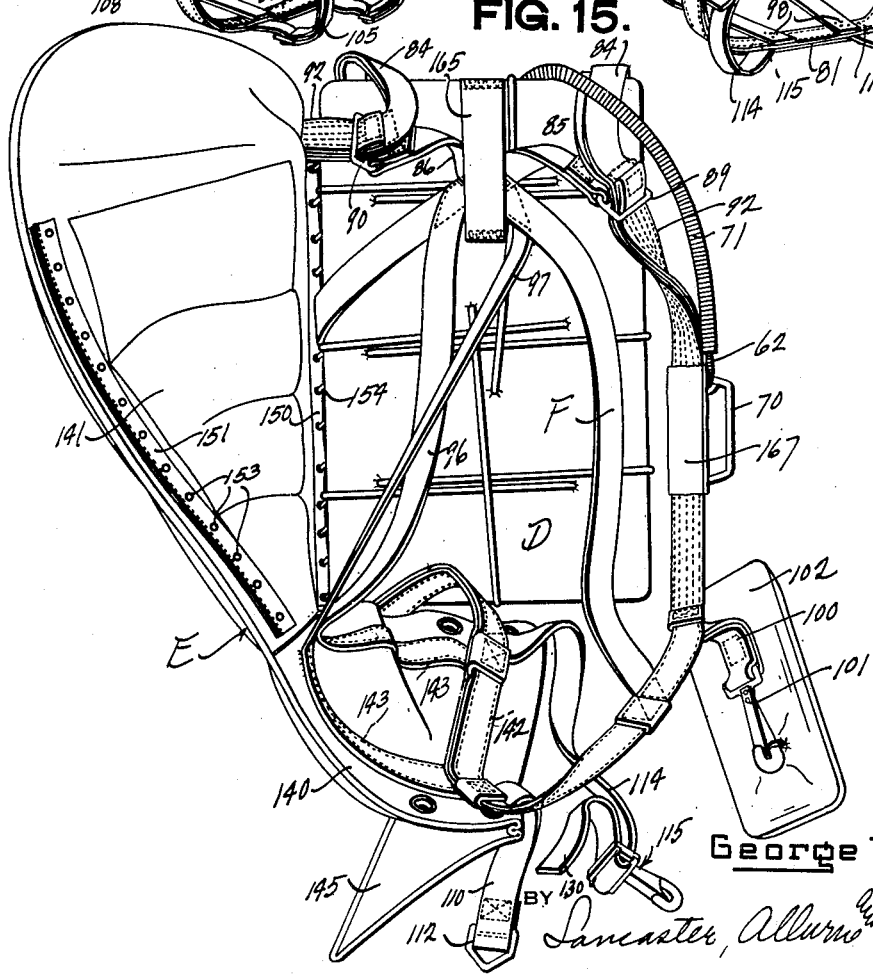

Figure 15 is a perspective view showing the association of the harness of Figure 14 upon a parachute pack and back and seat padding of the parachute chair.

Figure 16:
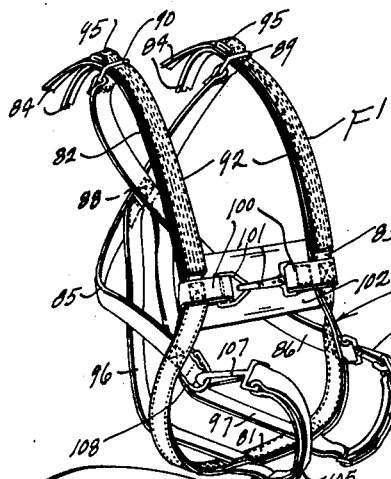

Figure 16 is a perspective view of another type of parachute harness adapted for use with the parachute chair and embodying individual leg straps, otherwise embodying the features of the harness shown in Figure 14.

Figures 17, 18, 19:
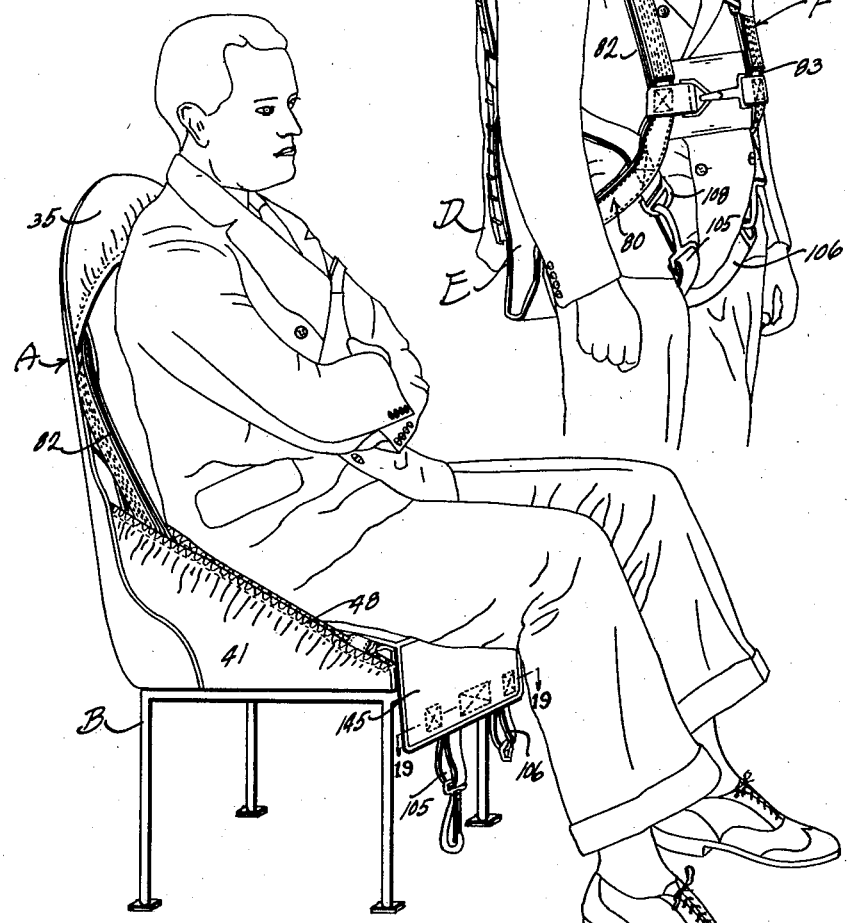

Figure 17 is a perspective view of a parachute chair preferably adapted for male passengers or aviators, utilizing the type of harness shown in Figure 16, although this type of harness is also adaptable for application upon female passengers and aviatrixes.

Figure 18 is a view showing the application of the harness and pack of the parachute chair (shown in Figure 17) upon the aviator; the passenger having arisen from the chair.

Figure 19 is a cross sectional view taken substantially on the line 19—19 of Figure 17.

In the drawings, wherein for the purpose of illustration are shown preferred and modified forms of the invention, the letter A may generally designate the improved parachute chair which may include the chair proper B; an upholstered cushion C thereon; a parachute pack D; padding E and a harness F.

The chair frame B may be of any approved type, such as conventionally used for aircraft of any approved type. These chairs are preferably made as light as possible for obvious reasons, and generally the chair frame may include the seat 25 and back 26. The seat 25 may be reinforced by marginal tubing 27, or like reinforcement and of course legs 28 may be provided for proper support of the seat. The back 26 may be of any approved shape, although it is preferably concavely formed in transverse cross section and near the upper and lower ends thereof the back slopes forwardlly concavely in order to snugly compact the parachute pack and harness details in a manner which will be subsequently mentioned hereinafter. Marginal reinforcing tubing 30, or other reinforcement, is also provided around the forward edges of the back 26. Both the seat 25 and back 26 may be made of thin gauge metal, preferably light in weight and non-corrosive. The seat and back may be angularly adjustable if desired (not shown) in accordance with any such feature of ordinary aircraft chairs, and the seat may be extensible upon its supporting framework if desired.

In order to completely finish the construction of the chair, the metal back 26 may be rearwardly covered by some flexible material, such as leather, imitation leather, fabric or other material 35, which is tightly drawn thereover and brought forwardly around the tubular reinforcing marginal material 30, and secured thereto in any approved manner.

The chair frame and body are also provided with pocketing means to efficiently retain details of the pack, harness and padding in unobtrusive manner. This pocketing means comprises a retaining flap or pocket 35 secured along the upper marginal edge of the back of the chair, contiguous with and secured in any approved manner to the back covering 35 of the chair, and preferably secured along the side uprights of the chair a slight distance. This flap 35 is loosely pouched and the lower margin thereof is provided with a pocketing hem 36 which houses an elastic band 37 therein. This band 37 is secured at its ends to the covering material or to the upright frame tubing of the back adjacent the side uprights of the back, and is under tension to draw the lower edge of the pouch closed and tight against the padding and top of the pack, for securing the same therein to normal position, as well as house upper details of the harness in a manner which is apparent from the drawings. Of course this elastic band may be expanded, and it is arcuately disposed as clearly shown in Figures 2 and 6 of the drawings, coming down forwardly over the pack and pad so that the pack and pad may cam out easily therefrom when the wearer, after attaching the harness to himself or herself, arises from the chair. If desired, the elastic band 36 need not be initially tensioned, but only tensioned when the pack and pad is assembled thereunder.

Side pockets are provided upon the chair, which receive the details of the harness in such manner that they may be released with facility when the harness is to be attached to the wearer. Thus, as shown in various views of the drawings, left and right pockets 40 and 41 are provided. Each of them consists of an outer preferably flexible wall 42, as shown in Figure 9 of the drawings, and an inner also preferably flexible wall 43. These walls are securely stitched as at 44 along the lower edge of the cushion C, although they may be secured to the horizontal seat frame tubing 27, if desired. It should be noted, however, that in the form shown the cushion C is stitched or otherwise secured as at 47 to the tubing 27, so that it is only necessary to secure the pocket walls 42 and 43 as at 44 to the cushioning material C. Any optional means of securing the lower edges of the pocket wall to the seat frame may be provided. The walls 42 and 43 are rather triangular in shape, and along their rear edges are secured either to the chair back framing or to the covering of said framing. The upper edges of these walls 42 and 43 are parallel and in preferably the same plane and preferably they extend diagonally downward from the back of the chair to the front edge of the seat of the chair. These upper edges of the walls 42 and 43 are provided with pocketed hems 48, which have elastic bands 49 disposed therein. The pocketing hems are preferably shirred, and the ends of the elastic band 49 are secured at the ends of the top edges of these walls adjacent the front edge of the seat and the back wall, and preferably under tension so as to draw the mouths 50 of the pockets closed. The walls 42 and 43 are preferably loosely pouched so that the harness and any other parts may be comfortably disposed therein, with assurance that the elastics 49 will draw the mouth of the pocket closed and prevent accidental slipping of the harness parts from the pocket.

It is of course optional whether an arm rest is used with the chair. This arrangement has been set forth in a co-pending application, Serial No. 725,646, filed May 14, 1934, but the type of pocket of my application may be used with an arm rest.

The cushion C forms the upholstery for the chair, and it may be a cushion of any approved type. It is fixedly secured to the chair seat in any approved manner, as by stitching the same to the frame tubing 27, as above mentioned. A rigid guard wall 55 is securely affixed to the seat wall 25 of the chair frame, to brace the rear of the cushion C. This guard wall 55 is spaced forwardly from the back wall 26 of the chair, at the base of the back wall, so that a compartment is provided between the wall 55 and the back 26 to receive the lower end of the pack D, so that the latter will always seat properly in the chair, as shown in Figure 8 of the drawings.

The pack D, in the example shown, is a back pack, although the chair is equally adaptable for use with a seat pack, and indeed it is within the contemplation of this invention to so associate the harness with the chair that the harness may receive a detachable emergency pack such as set forth in copending application, Serial No. 395,399, filed Sept. 26, 1929 which has matured into Patent No. 1,958,000 dated May 8, 1934.

The pack D is generally of the construction set forth in U. S. Patents #1,340,423; 1,403,983, and 1,554,192, including, as it does, a semi-rigid supporting wall 60 with which may be associated a covering, such as in the nature of flaps 61, which are secured in the usual manner by a rip cord 62. Of course the pack may vary widely in shape and characteristics, since other types of containers and parachute packs may be used than that shown. In the example shown the container houses therein a main parachute 63, a pilot parachute 64, and the shroud lines 65 are releasably housed in pockets on the inside of the wall 60. The parachute shroud lines are of course attached to the suspension lines of the harness in the usual manner, and as will be subsequently mentioned when describing the harness. The wall 60 when the pack is closed is preferably flat, although it may be of the form-fitting type set forth in U. S. Patent 1,882,086, if desired. The concave pocketing of the back of the chair receives the pack therein, and if desired the frame upon which the wall 60 of the container is built may be of springy material, so as to throw the flaps or covering open when the rip cord is pulled, so that the pilot and main parachutes may be instantly released. Other conventional features of the parachute packs may be used if desired. The pack D seats at its lower end between the wall 55 and the back wall of the chair and at its upper end seats between the wall of the chair and the flexible retaining wall 35.

The rip cord for opening the pack is provided with a handle 70, supported in any approved manner upon a pocket upon the harness, as will be subsequently mentioned, and a guard housing 71 may be provided for the rip cord. This rip cord and its guard housing may extend over the top of the pack, or may be extended laterally from the sides of the pack, so that it will not be covered or obstructed by the top pocketing of the chair.

Referring to the harness F, the same consists of a U-shaped supporting sling 80, which includes a seat portion 81 and right and left side riser portions 82 and 83, connected with the seat portion and adapted to extend upwardly along the sides of the wearer. They terminate in suspension lines 84, preferably two for each side riser portion. These suspension webs or straps 84 may be connected to the parachute in any approved manner, such as set forth in the patents above identified. Preferably two thicknesses of webbing are stitched together to form the sling 80, and the wearer sits in the sling, as in a swing, during a parachute descent. Back straps 85 and 86 are provided, stitched at 87 to the riser webs 82 and 83 respectively, preferably somewhere on these riser webs below the waist and at about the hips when adjusted upon a wearer. These straps 85 and 86 extend diagonally in crossing relation, and preferably secured together at 88, although a slip connection may be here provided if found necessary. The said straps 85 and 86 at their terminals are provided with metal couplings 89 and 90 respectively, in the nature of slip rings thru which the riser webs are slidably extended.

The riser webs 82 and 83, at their upper ends, from the shoulder portions thereof downwardly to about the waist, are provided with stiffener pieces 92, in the nature of stiff webbing, or of any other approved material, which render the webs at these points flexible yet sufficiently stiff to stand without collapsing. The couplings 89 and 90 are slidable along these stiffener pieces. The stiffener pieces at their upper ends 95 are thickened so that the couplings 89 and 90 cannot slip past the same.

In the application of the harness, as thus far described, the wearer sits in the harness as in a swing, with the back straps crossing between the shoulders and the adapters 89 and 90 lie at the shoulders of the wearer, preferably towards the front although the adapters may lie to the rear if desired. The couplings 89 and 90 will slide along the riser webs to adjust the harness to the stature of the wearer, but hold that position when once assumed.

To prevent the wearer from falling through the back part of the harness, additional retaining webs or straps 96 and 97 are provided, secured as at 98 upon the seat strap 81 and extending rearwardly in spaced substantial parallelism and from a point intermediate their ends converging towards the connection 88 of the diagonal back straps, and being respectively secured to the diagonal back straps 85 and 86 immediately adjacent the connection 88 above described, and as clearly shown in Figure 14 of the drawings.

Coupling means is provided for supporting the riser webs 82 and 83 upon the wearer at the breast or waist of the wearer, and this coupling means may be of any approved character, as, for instance, a belt. In the approved form the coupling means preferably consists of short lengths of straps or webbing 100, having complementary coupling parts 101 at the ends thereof by means of which the riser portions 82 and 83 may be held in properly retained relation upon the wearer. A pad 102 is secured to one of the coupling parts and its length of webbing, as shown in Figure 15 of the drawings, and is of sufficient length that the same will lie behind both coupling parts to protect the body of the wearer.

Strap means is provided to retain the lower portion of the harness upon the body of the wearer. This strap means may be of the usual construction, as shown in the harness F' of Figure 15, where independent leg straps 105 and 106 are provided, adjustable in length, having fasteners 107 at the free ends thereof for detachable connection with complementary fasteners 108. These fasteners 108 may be on strap ends continued from the back straps 85 and 86, or the said fastener parts 107 and 108 may be secured upon the riser portions 82 and 83 in any approved manner. Of course the leg straps 105 and 106 extend from the seat portion forwardly between the legs of the wearer and thence around the legs of the wearer, as well known to those skilled in the art. This type of harness is best adapted for male wearers.

As an improved feature of the harness, which has been broadly set forth in a co-pending application, Serial No. 725,646, filed May 14, 1934, there is provided an adjustable strap arrangement which encompasses the legs of the wearer; this strap means not extending between the legs, but holding the seat strap properly in position. Such strap arrangement consists of a strap 110 connected to the seat strap 81 as at 111, short of the end of the seat strap, and having at its free end a coupling ring or part 112. Another strap 114 is similarly connected at 115 short of the other end of the seat strap. This strap 114 has an adjustable coupling 115 thereon which is adapted to detachably interconnect with the coupling part 112. The strap 114 may be adjusted through this coupling 115 so that the straps 110 and 114 when connected together by the coupling devices 112 and 115 may be pulled tight about the legs of the wearer to hold such position and maintain the seat strap 81 beneath the seat of the wearer, so that the wearer when making a parachute descent may sit properly in the sling of the parachute, as in a swing.

While couplings similar to the coupling 115 have heretofore been provided, they possess some dangerous features. Therefore I regard the coupling 115 as an improvement. It consists of a strap receiving eye or ring 120, as shown in Figures 10 and 11 of the drawings, which is of substantially rectangular formation, including the long parallel bar portions 121 and 122 and the shorter side parallel bar portions 123 and 124. A slidable strap retaining bar 125 is provided for cooperative use with this eye, and in the coupling device set forth in a co-pending application, Serial No. 725,646, filed May 14, 1934, this bar is freely detachable from the eye, and there have been instances where the webbing, if not the full width of the long dimension of the eye opening, permits the said bar (under some circumstances) to be slipped through the eye opening. To obviate this I have provided retaining flanges 127 and 128 upon the bars 123 and 124 respectively, on the outer surfaces thereof, which provide facing retaining grooves 129 wherein the reduced ends 130 of the body 125 are slidable.

In the application of the coupling part 115 to the strap 114, the latter is slipped through the eye opening 120, at one side of the bar 125, wrapped about the outer surface of the bar 125 and then again threaded through the opening of the eye 120 at the opposite side of the bar, as shown in Figure 11 of the drawings. The free end 131 of the strap 114 is a take-up end and may be pulled to tighten the load end of the strap 114 about the wearer. Of course the rest of the construction of the coupling 115 may either consist of a snap fastener, as shown in Figure 10 of the drawings, at 133, or may assume any other approved form, such as an eye, etc.

The harness padding E preferably consists of a seat pad 140 and a back pad 141, as best shown in Figures 8 and 15 of the drawings. These pads may be of any approved nature and render the harness comfortable both while the individual is seated in the chair and when the harness is applied about his or her body. The application of the padding, however, presents some novel characteristics. For instance, the seat pad 140 is secured to the harness, preferably so that the harness will lie properly in position upon the chair. To that end the seat strap 81 is stitched, as at 142, upon the bottom of the seat pad 140, adjacent the fore part of the seat pad, and the parallel straps 96 and 97 are also stitched, as at 143, for a portion of their length, from the seat strap to the rear of the seat pad 140, as best shown in Figure 15 of the drawings. If desired these strap parts may be detachably secured to the seat pad, as by suitable strap fastening strap loops or snap fastener parts, well known in the parachute art.

The seat portion 140 of the padding at its free end may have a flexible flap 145, which is hinged to the front end of the pad 140. This protective flap is most useful in connection with the type of harness F″ shown in Figure 16, since it forms a guard or pad for such straps, providing comfort for the wearer. It may also be used with the harness F, as shown in Figure 14. The flap 145 depends at the front of the chair, as shown in the various views of the drawings, providing additional means for rendering the harness as unobtrusive as possible.

The back pad 141 is flexibly secured to the rear edge of the seat pad 140. It is provided with improved means to detachably secure the back pack D thereto. This means consists of a pair of lacing strips 150 and 151 sewn along opposite edges of the back pad 141, at the rear thereof. These strips 150 and 151 are sewn only along their edges most adjacent to the side edges of the back pad, and have eyelets 153 therein to receive lacing 154 by means of which the back pad may be detachably laced along the longitudinal edges of the container of the parachute pack. As shown in Figures 7 and 8 of the drawings, the container of the parachute pack at opposite side longitudinal edges thereof is provided with complementary lacing strips 160 secured thereto, having eyelets therein to receive the lacing 154. The upper portion of the back pad is preferably not laced to the pack, to permit ready attachment and release of the harness at that point, both with respect to the wearer and with respect to application upon the chair beneath the pocketing flap 35.

As additional means to support the harness properly with respect to the pack I provide a retaining strip 165 upon the pack container at the back wall thereof near the top of the pack, as shown in Figure 15 which may be sewn at its ends to the pack to provide a loop, or which may have snap fastening means at one end thereof so that the loop may be opened. The said loop receives the back straps therethrough at the diagonally crossed connection of the said back straps, and supports all of the back strap arrangement of the harness upon the pack, so that it cannot sag into disarranged relation.

The rip cord handle 70 is contained within a pocket 167, which is of the nature of the pocket set forth in U. S. Patent #1,758,795, but which is slidable along the stiffened portion of the riser web 83, so that the same may be properly adjusted to suit the harness to the stature of the wearer. This pocket adjustment is not an improved feature of the present invention, but has been set forth in a co-pending application, Serial No. 725,646, filed May 14, 1934.

As is shown in Figure 8 of the drawings the pack is retained within the socketing recess in the back of the chair frame, with the upper portion of the pack and the upper portion of the back pad 141 disposed beneath the retaining flap 35. The upper shoulder portions of the harness, including the adapters 89 and 90 and short lengths of the upper stiffened portions of the riser webs also extend beneath this pocketing flap 35, and project therefrom between the back pad and pack at the extreme sides of the chair back, where the restricting elastic of the pocketing flap is connected, as clearly shown in Figure 2 of the drawings. The lower portions of the harness are pocketed in the side pockets of the chair, and the pocket 40 is also adapted to receive the breast pad 102. The seat straps 110 and 114 of the harness F may also be placed in the side pockets 40 and 41, if desired, or may be folded under the seat pad 140. In the case of the harness F′ the leg straps 105 and 106 are rather short and may depend, as shown in Figure 17.

When in the above compacted position all of the harness that shows are the portions of the stiffened upper ends of the riser webs (see Figure 2) and these outstand slightly and extend diagonally downward so that a wearer may readily slip his or her arm behind the same when it is necessary to apply the harness.

For application of the harness it is merely necessary for the wearer to slip his or her arms behind the extended portions of the riser webs, pull the same forwardly. This will bring the breast coupling parts of the harness from the side pockets 40 and 41 and they may be snapped together at the front of the wearer. The lap or leg strap may then be either pulled out of the pockets or from beneath the seat pad and applied. In the harness F the free end of the strap 114 is pulled to tighten the strap arrangement across the lap of the wearer. The wearer by leaning forward and arising cams the harness and upper portion of the back pad 141 and upper portion of the pack from beneath the retaining pocket or flap 35, without any difficulty. It is of course optional at exactly what point the adapters 89 and 90 may be adjusted upon the wearer, either at the top of the shoulder, to the front thereof, or to the rear of the shoulder. Such point of connection only determines the posture in which the wearer is supported from the parachute during a descent.

It is of course apparent that the wearer upon detachment of the harness and pack from the chair, as shown in Figures 5 and 18 of the drawings, may readily release the parachute from the pack upon pulling of the rip cord in the usual manner.

Upon transport planes the passenger will of course be given some preliminary instruction by the pilot or steward as to the manner in which the harness is applicable upon the body in case of emergency.

It is to be understood that different types of harnesses than those shown may be used, for instance the quick release harness of U. S. Patent #1,899,656.

Various changes in the shape, size, and arrangement of parts may be made to the forms of invention herein shown and described, without departing from the spirit of the invention or the scope of the claims.

I claim:

1. As an article of manufacture a parachute aircraft chair comprising seat and back portions, a parachute pack hood at the top of the chair having resilient pack retaining means therein, and pockets at the sides of the chair having means yieldably closing the entrances thereto, said pockets opening upwardly.

2. In a parachute harness the combination of a U-shaped supporting sling including a seat strap and side riser and suspension webs, strap means connected with the seat portion for retaining the same in position beneath the seat of the wearer so that the wearer may be supported in the sling as in a swing during a parachute descent, diagonally disposed back straps connected with the seat strap of the sling and having their upper ends provided with adjustable connections with the riser webs, and other body retaining straps connected with the seat strap and extending therefrom rearwardly and upwardly and being connected to the said diagonally disposed back straps adjacent the crossing point of the latter.

3. In a parachute chair the combination of seat and back rests, a harness including riser webs having portions of the lengths thereof stiffened to inherently hold their position, and means releasably secreting and pocketing the harness upon the seat and back thereof and along the sides of the chair with the stiffened portions of the harness exposed at the sides of the chair so as to permit a user to slip his or her arms therethrough.

4. In a chair for parachute apparatus the combination of a seat, a back, and a flexible covering at the top of the chair back providing a downwardly facing opening adapted to releasably receive therein part of the parachute apparatus in order to safely hold the same in place upon the chair back for emergency attachment by the wearer.

5. In a chair for parachute apparatus the combination of a seat, a back, a flexible covering at the top of the chair back providing a downwardly facing opening adapted to releasably receive therein part of the parachute apparatus in order to safely hold the same in place upon the chair back for emergency attachment, and resilient means attached to said covering for yieldably restricting the opening provided thereby.

6. In a chair adapted to receive parachute apparatus for emergency attachment the combination of a seat, a back, and a flexible covering flap secured at the top of the back on the forward face thereof having a downwardly facing opening and providing a pocket wherein portions of parachute apparatus may be safely stowed in position to facilitate emergency attachment.

7. In a parachute chair the combination of a seat, a back, and a resiliently restricted flexible parachute harness covering for holding the harness on the back of a chair in releasable position for a wearer's quick attachment.

GEORGE WAITE.